(12) United States Patent
Schumacher et al.

(10) Patent No.: US 10,331,411 B2
(45) Date of Patent: Jun. 25, 2019

(54) SYSTEMS AND METHODS FOR GENERATING RANDOM NUMBERS USING PHYSICAL VARIATIONS PRESENT IN MATERIAL SAMPLES

(71) Applicant: 3M INNOVATIVE PROPERTIES COMPANY, St. Paul, MN (US)

(72) Inventors: Jennifer F. Schumacher, Woodbury, MN (US); Glenn E. Casner, Woodbury, MN (US); Yanina Shkel, Princeton, NJ (US); Andrew P. Bonifas, Alberta (CA); Anthony J. Sabelli, Darien, CT (US); Brian J. Stankiewicz, Mahtomedi, MN (US); John A. Wheatley, Lake Elmo, MN (US); Ravishankar Sivalingam, Foster City, CA (US); Robert W. Shannon, Roseville, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 15/532,537

(22) PCT Filed: Dec. 1, 2015

(86) PCT No.: PCT/US2015/063184
§ 371 (c)(1),
(2) Date: Jun. 2, 2017

(87) PCT Pub. No.: WO2016/133573
PCT Pub. Date: Aug. 25, 2016

(65) Prior Publication Data
US 2018/0364984 A1    Dec. 20, 2018

Related U.S. Application Data

(60) Provisional application No. 62/086,961, filed on Dec. 3, 2014.

(51) Int. Cl.
*G06F 7/58* (2006.01)

(52) U.S. Cl.
CPC .................................... *G06F 7/588* (2013.01)

(58) Field of Classification Search
None
See application file for complete search history.

(56) References Cited

U.S. PATENT DOCUMENTS 5,521,984 A    5/1996  Denenberg
5,732,138 A    3/1998  Noll et al.
(Continued)

OTHER PUBLICATIONS

ID Quantique [on line], [retrieved from the internet on Aug. 1, 2017], URL <http://www.idquantique.com/>, 4 pages.
(Continued)

*Primary Examiner* — David H Malzahn
(74) *Attorney, Agent, or Firm* — Yufeng Dong

(57) ABSTRACT

Systems and methods for generating random bits by using physical variations present in material samples are provided. Initial random bit streams are derived from measured material properties for the material samples. In some cases, secondary random bit streams are generated by applying a randomness extraction algorithm to the derived initial random bit streams.

20 Claims, 10 Drawing Sheets

(56) References Cited

U.S. PATENT DOCUMENTS

| | | | |
|---|---|---|---|
| 7,949,148 B2 | 5/2011 | Rhoads | |
| 8,224,018 B2 | 7/2012 | Rhoads | |
| 8,325,971 B2* | 12/2012 | Boutant | G06K 19/06046 |
| | | | 382/100 |
| 8,379,848 B2 | 2/2013 | Muise et al. | |
| 8,886,692 B2* | 11/2014 | Vasyltsov | G06F 7/588 |
| | | | 708/251 |
| 2004/0039762 A1* | 2/2004 | Hars | G06F 7/588 |
| | | | 708/255 |
| 2006/0063456 A1 | 3/2006 | Carter | |
| 2009/0144351 A1* | 6/2009 | Rueping | G06F 7/58 |
| | | | 708/255 |
| 2009/0257619 A1 | 10/2009 | Boutant | |
| 2009/0264657 A1* | 10/2009 | Wagner | A61K 8/347 |
| | | | 546/242 |
| 2014/0025718 A1* | 1/2014 | Chen | G06F 7/588 |
| | | | 708/254 |
| 2014/0222881 A1* | 8/2014 | Pirvu | G07F 17/3223 |
| | | | 708/255 |
| 2018/0364984 A1* | 12/2018 | Schumacher | G06F 7/588 |

OTHER PUBLICATIONS

International Search Report for PCT International Application No. PCT/US15/63184, dated Aug. 11, 2016, 2 pages.
Lsa, Ingenia Technology [on line], [retrieved from internet on Aug. 1, 2017], URL <http://www.ingeniatechnology.com/lsa#company>, 5 pages.
Quantum Random Number Generators, ComScire [on line], [retrieved from the internet on Aug. 1, 2017], URL <http://comscire.com/>, 4 pages.
Simtec Electronics [on line], [retrieved from the internet on Aug. 1, 2017], URL<http://www.simtec.co.uk/>, 2 pages.
What's this fuss about true randomness?, Random.Org. [on line], [retrieved from internet on Aug. 1, 2017], URL<http://www.random.org/>, 2 pages.

* cited by examiner

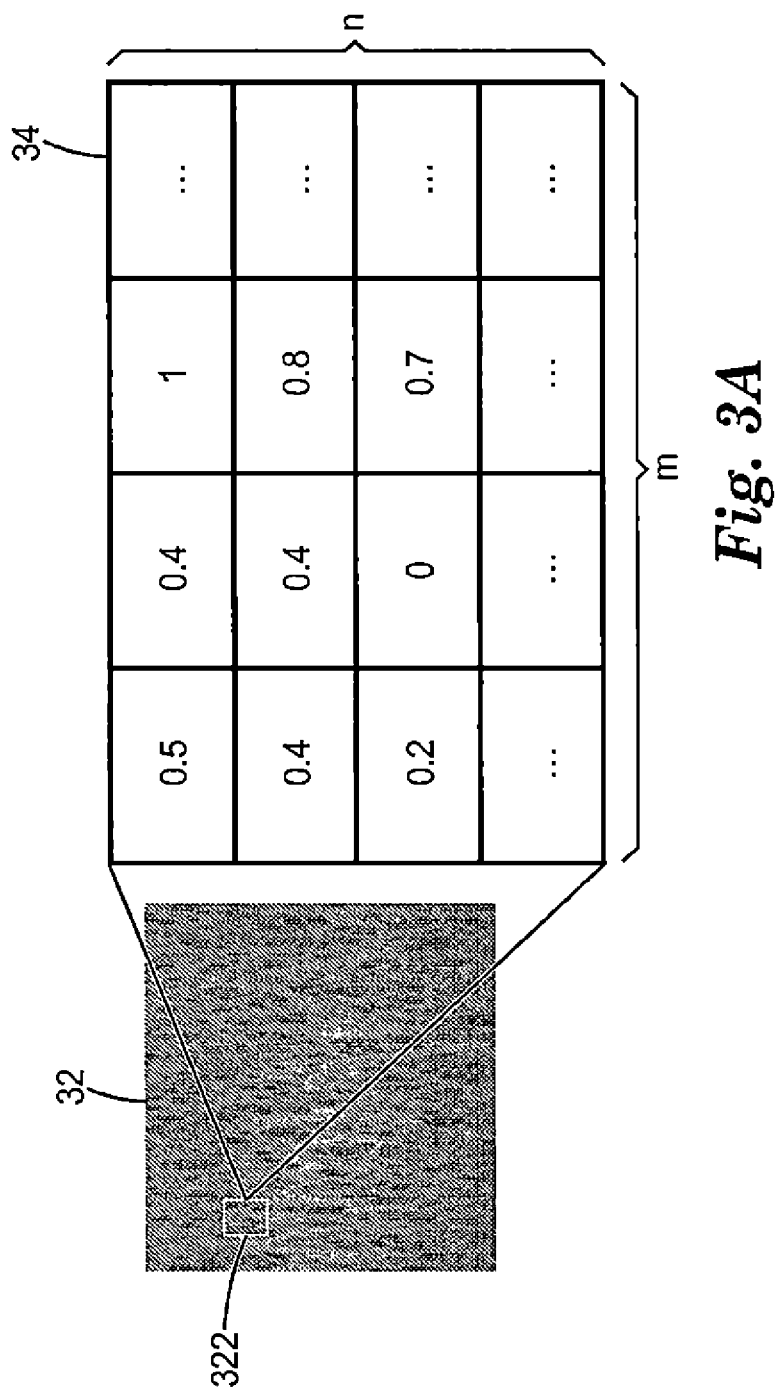

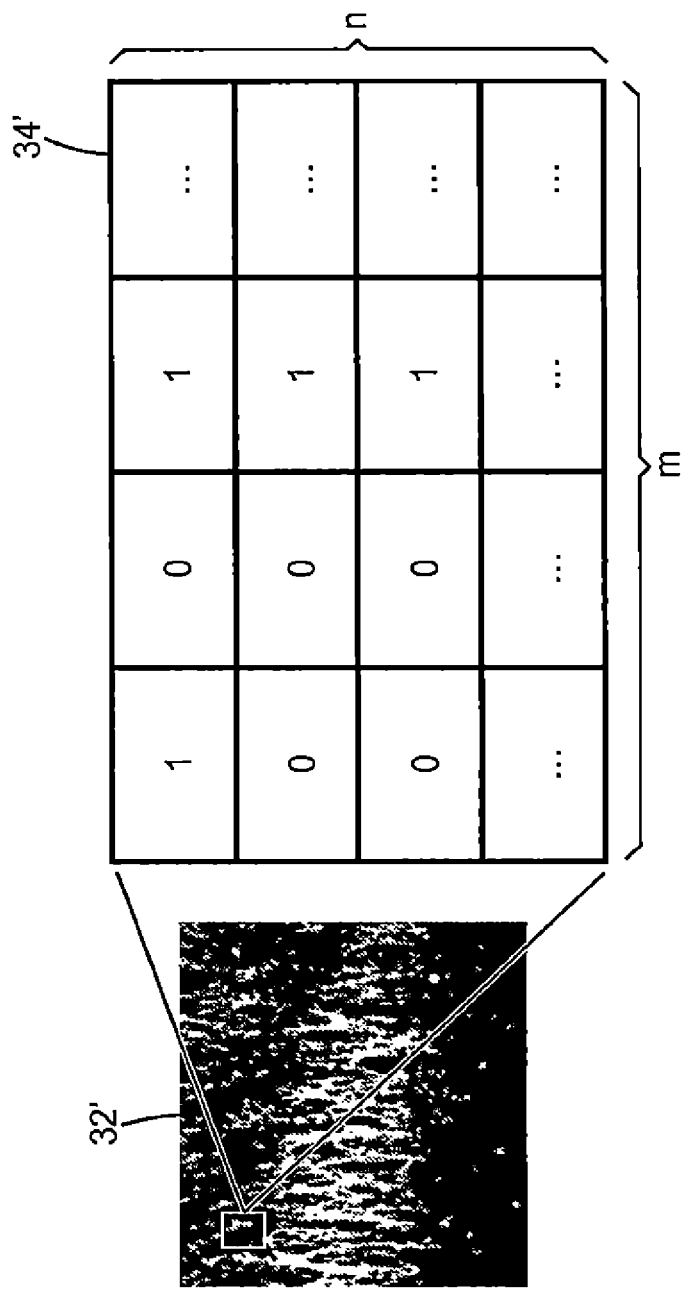

SYSTEMS AND METHODS FOR GENERATING RANDOM NUMBERS USING PHYSICAL VARIATIONS PRESENT IN MATERIAL SAMPLES

CROSS REFERENCE TO RELATED APPLICATIONS

This application is a national stage filing under 35 U.S.C. 371 of PCT/US2015/063184, filed Dec. 1, 2015, which claims the benefit of U.S. Application No. 62/086,961, filed Dec. 3, 2014, the disclosure of which is incorporated by reference in its/their entirety herein.

TECHNICAL FIELD

The present disclosure relates to generating random numbers using physical variations present in material samples.

BACKGROUND

Random number generators (RNGs) are important for applications which require the creation and use of a sequence of numbers or symbols lacking any order or pattern. RNGs can be implemented in applications such as cryptography, gambling, computer modeling or simulation, and statistical sampling. In many cryptographic applications, for example, the underlying encryption protocols are only as good (e.g., secure and/or robust) as the random numbers they use. As such, randomness is a desirable feature and having access to many cheap high quality random bits is often essential. RNGs may typically fall into two categories: pseudo random number generators (PRNGs) and physical random number generators. A PRNG inputs a small random seed and generates a longer string which appears random. However, a PRNG uses an entirely deterministic process and so the knowledge of the algorithm used together with a seed is sufficient to guess the exact longer sequence. Cryptographic algorithms using poorly designed PRNGs may be subject to cryptoanalytic attack. In contrast, physical RNGs use physical phenomena such as entropic or acoustical variation or radioactive decay, for example, to produce random numbers. Theoretically the bit stream they produce is completely unpredictable.

SUMMARY

There is a desire to generate high-quality random bits or random numbers based on their prevalence in industrial or consumer applications and cryptographic importance. Many materials have inherent physical variability in their properties which can be used to generate high quality random bits. Briefly, in one aspect, the present disclosure describes systems and methods for generating random bits by using physical variations present in material samples. The use of inherent physical variability of materials provides a distinct, cost-effective way to obtain high-quality random numbers. Some embodiments in this disclosure also leverage the randomness inherent in the manufacturing process to generate random numbers.

In one aspect, a method of generating random numbers includes providing one or more material samples. One or more material properties for each of the material samples are measured where the measured material properties have respective variability. One or more initial random bit streams are derived from the measured material properties for each of the material samples.

In another aspect, a method of extracting random numbers from a batch of material samples, is provided. The batch of material samples can have substantially the same composition and can be produced by substantially the same process. One or more material properties for each of the material samples are measured. The measured material properties have respective variability. One or more initial random bit streams are derived from the measured material properties for each of the material samples. The derived initial random bit streams for the batch of material samples are combined to arrive at a combined random bit stream. One or more random numbers are generated by applying a randomness extraction algorithm to the combined random bit stream.

Various unexpected results and advantages are obtained in exemplary embodiments of the disclosure. One such advantage of exemplary embodiments of the present disclosure is that the utilized randomness described herein is originated from inherent physical variability of material properties, which provides distinct, cost-effective, high-quality random bit streams that are useful in a variety of applications.

LISTING OF EXEMPLARY EMBODIMENTS

Exemplary embodiments are listed below. It is to be understood that any of embodiments A to K, L to P, and Q to X can be combined.

Embodiment A. A method of generating random numbers, comprising:
providing one or more material samples;
measuring one or more material properties for each of the material samples, the measured material properties having variability; and
deriving one or more initial random bit streams from the measured material properties for each of the material samples.

Embodiment B. The method of embodiment A, further comprising generating one or more secondary random bit streams by applying a randomness extraction algorithm to the derived initial random bit streams.

Embodiment C. The method of embodiment A or B, wherein measuring the material properties comprises capturing an image for a surface of the material samples.

Embodiment D. The method of embodiment C, wherein deriving the initial random bit streams further comprises determining surface variations of a characteristic feature from the image of the material samples, the characteristic feature related to a substructure or a texture of the surface of the material samples, and converting the surface variations into the initial random bit streams.

Embodiment E. The method of embodiment D, wherein determining the surface variations further comprises converting the image to a binary representation based on intensity values of pixels of the image.

Embodiment F. The method of any one of preceding embodiments, wherein the material properties include an optical feature, an acoustical feature, an elastic feature, a structural feature, an electronic feature, a magnetic feature, an electrets related feature, or a mechanical feature, and the variability of material properties is naturally formed or related to a specific manufacturing process for making the material samples.

Embodiment G. The method of any one of preceding embodiments, wherein the randomness extraction algorithm includes a block parity extractor.

Embodiment H. The method of any one of preceding embodiments, wherein the secondary random bit streams are capable of passing a test of independent, identically distributed (IID) random bits.

Embodiment I. The method of any one of preceding embodiments, wherein the one or more material samples are a batch of material samples, wherein the compositions of the batch of material samples are substantially the same, and are produced by substantially the same process.

Embodiment J. The method of embodiment I, further comprising combining the initial random bit streams from the batch of material samples to arrive at a combined random bit stream, and generating the secondary random bit streams by applying the randomness extraction algorithm to the combined random bit stream.

Embodiment K. The method of embodiment I or J, wherein the batch of material samples is selected from the group consisting of abrasives, optical films, and nonwovens.

Embodiment L. A method of extracting random numbers from a batch of sample materials, the batch of materials consisting of substantially the same composition and being produced by substantially the same process, the method comprising:
  measuring one or more material properties for each of the material samples, the measured material properties having variability;
  deriving one or more initial random bit streams from the measured material properties for each of the material samples;
  combining the derived initial random bit streams for the batch of material samples to arrive at a combined random bit stream; and
  generating one or more random numbers by applying a randomness extraction algorithm to the combined random bit stream.

Embodiment M. The method of embodiment L, wherein measuring the material properties comprises capturing surface images for the batch of material samples.

Embodiment N. The method of embodiment M, wherein deriving the initial random bit streams further comprises determining surface variations of a characteristic feature from the surface images.

Embodiment O. The method of embodiment N, wherein determining the surface variations further comprises converting the images to binary representations based on intensity values of pixels of the images.

Embodiment P. The method of any one of embodiments L to O, wherein the material properties include an optical feature, an acoustical feature, an elastic feature, a structural feature, an electronic feature, a magnetic feature, an electrets related feature, or a mechanical feature.

Embodiment Q. A random number generator, comprising:
  a measurement component configured to measure one or more material properties for one or more material samples, the measured material properties having variability; and
  a computation component functionally connected to the measurement component, the computation component including a processor configured to deriving one or more initial random bit streams from the measured material properties for each of the material samples.

Embodiment R. The random number generator of embodiment Q, wherein the processor is configured to generate one or more secondary random bit streams by applying a randomness extraction algorithm to the derived initial random bit streams.

Embodiment S. The random number generator of embodiment Q or R, further comprises a memory configured to store material properties data.

Embodiment T. The random number generator of any one of embodiments Q to S, wherein the measurement component includes a camera configured to capture one or more images of the material samples.

Embodiment U. The random number generator of embodiment T, wherein the processor is configured to determine surface variations of a characteristic feature from the one or more images of the material samples, the characteristic feature related to a substructure or a texture of the surface of the material samples, and the processor is configured to convert the surface variations into the initial random bit streams.

Embodiment V. The random number generator of embodiment U, wherein the processor is configured to convert the one or more images to a binary representation based on intensity values of pixels of the respective images.

Embodiment W. The random number generator of any one of embodiments Q to V, wherein the material properties include an optical feature, an acoustical feature, an elastic feature, a structural feature, an electronic feature, a magnetic feature, an electrets related feature, or a mechanical feature.

Embodiment X. The random number generator of any one of embodiments R to V, wherein the randomness extraction algorithm includes a block parity extractor.

Various aspects and advantages of exemplary embodiments of the disclosure have been summarized. The above Summary is not intended to describe each illustrated embodiment or every implementation of the present certain exemplary embodiments of the present disclosure. The Drawings and the Detailed Description that follow more particularly exemplify certain preferred embodiments using the principles disclosed herein.

BRIEF DESCRIPTION OF THE DRAWINGS

The disclosure may be more completely understood in consideration of the following detailed description of various embodiments of the disclosure in connection with the accompanying figures, in which:

FIG. 3A illustrates an optical image of a material sample and intensity values of image pixels of the optical image, according to one embodiment.

FIG. 3B illustrates a converted optical image and binary representation of intensity values thereof, according to one embodiment.

Figure 1:
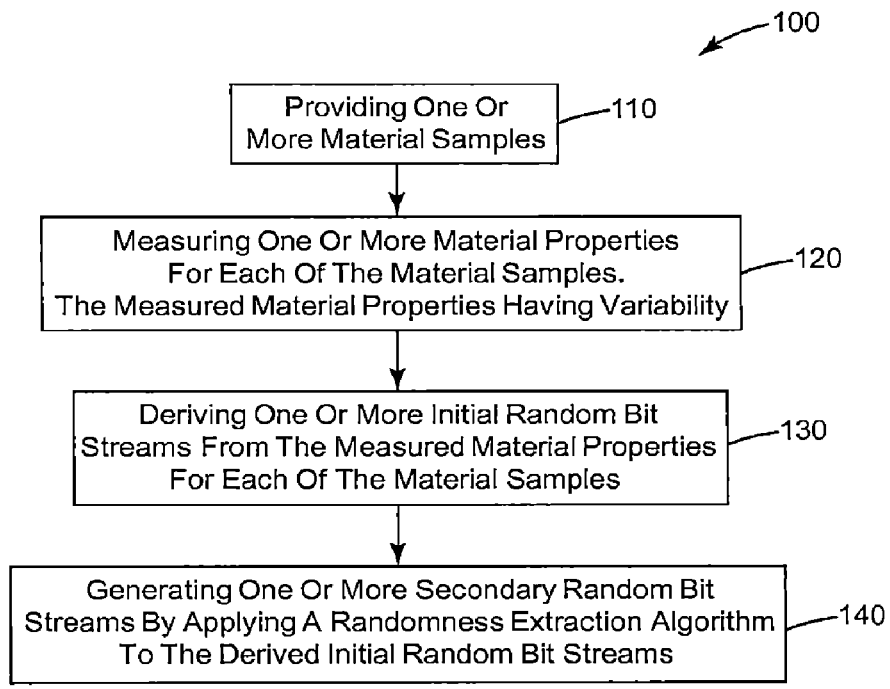
FIG. 1 is a flow diagram of a method for generating random numbers, according to one embodiment.

In the drawings, like reference numerals indicate like elements. While the above-identified drawing, which may not be drawn to scale, sets forth various embodiments of the present disclosure, other embodiments are also contemplated, as noted in the Detailed Description. In all cases, this disclosure describes the presently disclosed disclosure by way of representation of exemplary embodiments and not by express limitations. It should be understood that numerous other modifications and embodiments can be devised by those skilled in the art, which fall within the scope and spirit of this disclosure.

DETAILED DESCRIPTION

Many materials have inherent physical variability in their properties which can be used to generate high quality random bits. Briefly, in one aspect, the present disclosure describes systems and methods for generating random bits by using physical variations present in material samples. The use of inherent physical variability of materials provides a cost-effective way to obtain high quality random numbers. In some embodiments, the physical variability of material properties may naturally formed and present in the materials, while in other embodiments, specific manufacturing processes may generate or modify the physical variability of material properties. Some embodiments in this disclosure also leverage the randomness inherent in the manufacturing process to generate random numbers.

FIG. 1 illustrates a method 100 of generating random numbers or random bit streams. At 110, one or more material samples are provided. The material samples can be various material samples that are commercially available from, for example, 3M Company, St. Paul, Minn. The material samples can include, for example, abrasives, optical films, nonwovens, etc. The material samples exhibit at least one material property having variability which can be naturally formed, or originated from specific manufacturing processes. The material property can include, for example, an optical feature, an acoustical feature, an elastic feature, a structural feature, an electronic feature, a magnetic feature, an electrets related feature, a mechanical feature, etc. The method 100 then proceeds to 120.

At 120, one or more material properties are measured for each of the material samples. In some embodiments, a surface image of the material samples can be captured by, for example, a digital camera. The method 100 then proceeds to 130.

At 130, one or more initial random bit streams are derived from the measured material properties for each of the material samples. In some embodiments, surface variations of a characteristic feature can be determined from the surface image of the material samples. The characteristic feature can be related to, for example, a substructure or texture of the surface of material samples. In some embodiments, the surface image of the material sample can be converted into a binary representation based on, for example, intensity values of the pixels of the image. The method 100 then proceeds to 140.

Optionally, at 140, one or more secondary random bit streams are generated by applying a randomness extraction algorithm to the initial random bit streams. The randomness extraction algorithm can include one or more of, for example, a block parity extractor, a von Neumann extractor, a random walk extractor, etc. In some embodiments, two or more randomness extraction algorithms can be applied to the initial random bit streams simultaneously or sequentially to generate the secondary random bit streams.

Figure 2:
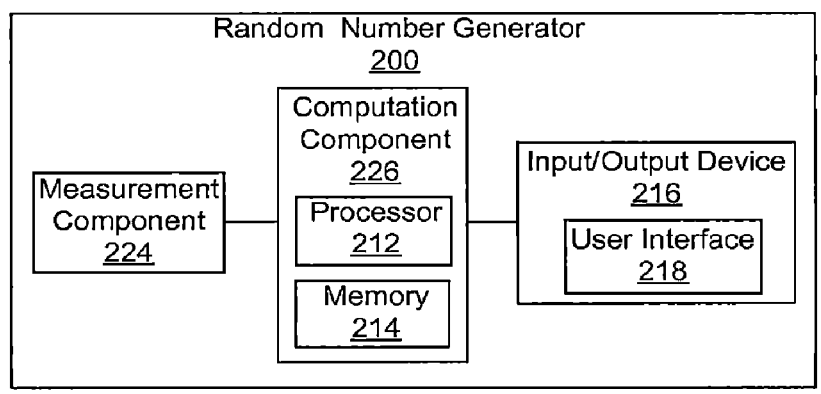
FIG. 2 illustrates a block diagram for a random number generator, according to one embodiment.

FIG. 2 illustrates a random number generator 200 for generating random numbers from material samples by implementing, for example, the method 100, according to one embodiment. The random number generator 200 includes a measurement component 224, a computation component 226, and one or more input/output devices 216.

The measurement component 224 is configured to measure one or more material properties of the material samples. The measurement component 224 can be various measurement tools to measure material properties having inherent variability including, for example, one or more of an optical feature, an acoustical feature, an elastic feature, a structural feature, an electronic feature, a magnetic feature, electrets, or a mechanical feature. In some embodiments, the measurement component 224 can include, for example, a camera for capturing one or more images of the material samples.

In the embodiment of FIG. 2, the computation component 226 includes a processor 212 and a memory 214. The computation component 226 is functionally connected to the measurement component 224, receives signals related to the measured material properties from the measurement component 224, and derives one or more initial random bit streams from the received signals. The processor 212 may apply one or more randomness extraction algorithms to the derived initial random bit streams to generate one or more secondary random bit streams. The randomness extraction algorithm may include one or more of, for example, a block parity extractor, a von Neumann extractor, a random walk extractor, etc. In some embodiments, the randomness extraction algorithm can be predetermined and stored in the memory 214. In some embodiments, the randomness extraction algorithm can be selected from a list of randomness extraction algorithms stored in the memory 214 according to the derived initial random bit streams. The generated random numbers may be stored in the memory 214. The processor 212 may also perform additional processing on a random bit stream such as, for example, binarization and vectorization to be discussed further below.

In some embodiments, the measurement component 224 may be a portable device that can work in field. The measurement component 224 can wirelessly communicate with a remote computing device such as, for example, the computation component 226 by sending and receiving signals. The computation component 226 may be integrated with, for example, a computer, a server, a mobile phone, etc. The computation component 226 can process the received material property signals and send the generated random numbers to the input/output device 216 to display thereon.

The memory 214 stores information. In some embodiments, the memory 214 can store instructions for performing the methods or processes described herein. In some embodiments, material properties data can be pre-stored in the memory 214. One or more properties from the material samples, for example, an optical feature, an acoustical feature, an elastic feature, a structural feature, an electronic feature, a magnetic feature, an electrets related feature, or a mechanical feature, may be stored as the material properties data.

The memory 214 may include any volatile or non-volatile storage elements. Examples may include random access memory (RAM) such as synchronous dynamic random access memory (SDRAM), read-only memory (ROM), non-volatile random access memory (NVRAM), electrically erasable programmable read-only memory (EEPROM), and FLASH memory. Examples may also include hard-disk, magnetic tape, a magnetic or optical data storage media, a compact disk (CD), a digital versatile disk (DVD), a Blu-ray disk, and a holographic data storage media.

The processor 212 may include, for example, one or more general-purpose microprocessors, specially designed processors, application specific integrated circuits (ASIC), field programmable gate arrays (FPGA), a collection of discrete logic, and/or any type of processing device capable of executing the techniques described herein. In some embodiments, the processor 212 (or any other processors described herein) may be described as a computing device. In some embodiments, the memory 214 may be configured to store program instructions (e.g., software instructions) that are executed by the processor 212 to carry out the processes or methods described herein. In other embodiments, the processes or methods described herein may be executed by specifically programmed circuitry of the processor 212. In some embodiments, the processor 212 may thus be configured to execute the techniques for generating random numbers described herein. The processor 212 (or any other processors described herein) may include one or more processors.

Input/output device 216 may include one or more devices configured to input or output information from or to a user or other device. In some embodiments, the input/output device 216 may present a user interface 218 where a user may control the assessment of the generation of a random number. For example, user interface 218 may include a display screen for presenting visual information to a user. In some embodiments, the display screen includes a touch sensitive display. In some embodiments, a user interface 218 may include one or more different types of devices for presenting information to a user. The user interface 218 may include, for example, any number of visual (e.g., display devices, lights, etc.), audible (e.g., one or more speakers), and/or tactile (e.g., keyboards, touch screens, or mice) feedback devices. In some embodiments, the input/output devices 216 may represent one or more of a display screen (e.g., a liquid crystal display or light emitting diode display) and/or a printer (e.g., a printing device or component for outputting instructions to a printing device). In some embodiments, the input/output device 116 may be configured to accept or receive program instructions (e.g., software instructions) that are executed by the processor 112 to carry out the embodiments described herein.

The random number generator 200 may also include other components and the functions of any of the illustrated components including the processor 212, the memory 214, and the input/output devices 216 may be distributed across multiple components and separate devices such as, for example, computers. The random number generator 200 may be configured as a workstation, desktop computing device, notebook computer, tablet computer, mobile computing device, or any other suitable computing device or collection of computing devices. The random number generator 200 may operate on a local network or be hosted in a Cloud computing environment. The illustrated components of FIG. 2 are shown merely to explain various aspects of the present disclosure and the addition or removal of components would be apparent to one of skill in the art.

In some embodiments, the random number generator 200 allows a user to take a material sample, e.g., a 3M manufactured material sample, and insert the material sample into the generator 200. The inherent randomness present in the material sample can be measured and a randomness extraction algorithm can be applied which, in turn, can produce a sequence of random bits. The random bits can then be used by any computing device for any application that needs, for example, encryption.

In some embodiments, a material-based random number generator such as the random number generator 200 can be used in object identification. Random numbers uniquely derived from material features can allow for digital material authentication. For example, the method 100 of FIG. 1 and the random number generator 200 of FIG. 2 can be used to add a cryptographic or steganographic features to, for example, personal documents such as passports or identification cards.

Figure 3C:
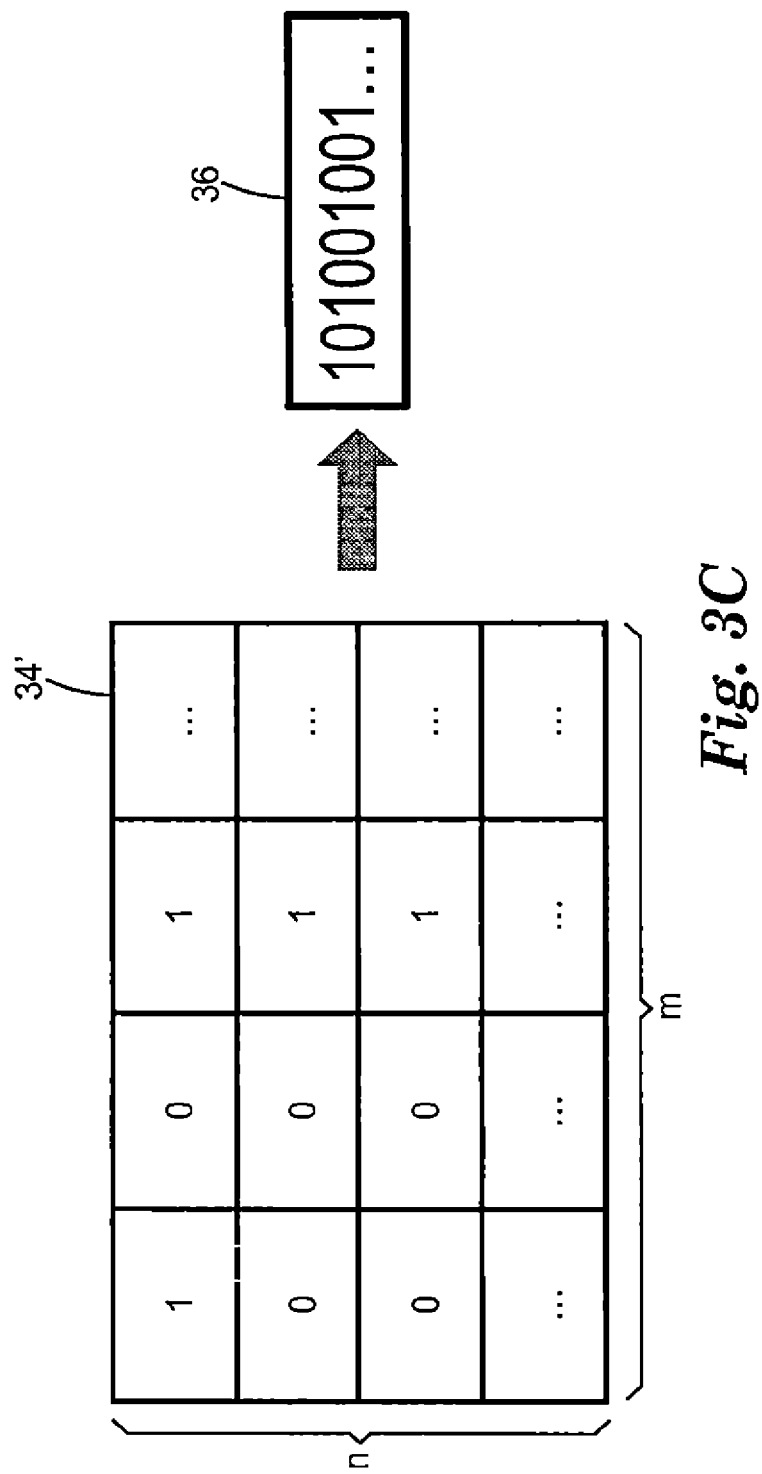
FIG. 3C illustrates obtaining initial bits based on the binary representation of FIG. 3B, according to one embodiment.

FIGS. 3A to 3E illustrates generating random numbers from optical images of material samples, according to one embodiment. FIG. 3A shows an optical image 32 measured for a material sample. The optical image 32 includes pixels having various intensities which may relate to, for example, a substructure or a texture on the surface of the material sample. The optical image 32 can be captured by, for example, the measurement component 226 of FIG. 2. The various intensities of the pixels reflect, for example, the inherent randomness of the substructure or texture of the material sample surface. The intensity values of image pixels in an exemplary portion 322 of the optical image 32 are shown in Table 34. The intensity values can be normalized, via for example the computation component 226 of FIG. 2, to be between 0 and 1 and are listed in an array m×n. It is to be understood that any portion of the optical image 32 or the whole optical image 32 can be used to obtain the corresponding intensity values.

The optical image 32 can be converted to a binary representation 32' shown in FIG. 3B. Accordingly, the intensity values of image pixels in Table 34 are converted into binary values 0 or 1 in Table 34'. The conversion can be conducted by, for example, the computation component 226 of FIG. 2. The array of binary values of Table 34' is then vectorized by the computation component 226 to obtain an initial bit stream 36. The initial bit stream 26 includes a series of bits 0 or 1 as shown in FIG. 3C. In some embodiments, the initial random bit stream 36 may include the (m×n) number of binary bits which correspond to the binary representation 32' of the optical image 32 as shown in FIG. 3B. It is to be understood that the initial bit stream 36 can be obtained from at least a portion of the array of binary values in Table 34' by any appropriate ways. Instructions for obtaining the initial bit stream 36 from the array of binary values in Table 34' can be stored in the memory 214 and executed by the processor 212 of the computation component 226.

Figure 3D:
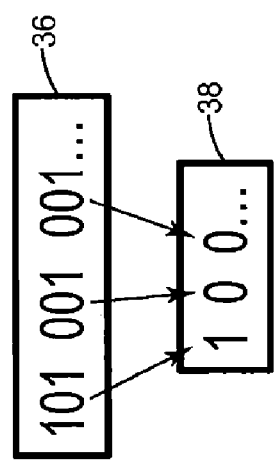
FIG. 3D illustrates generating secondary bits based on the initial bits of FIG. 3C, according to one embodiment.

The initial random bit stream 36 is then processed by applying a randomness extraction algorithm to generate a secondary random bit stream 38 as shown in FIG. 3D. The randomness extraction algorithm can include one or more of, for example, a block parity extractor, a von Neumann extractor, a random walk extractor, etc. It is to be understood that a randomness extraction algorithm can be iteratively applied to the initial bit stream and/or the secondary random bit stream to generate a final random bit stream. It is also to be understood that two or more randomness extraction algorithms can be combined to apply to the initial random bit stream sequentially or at the same time.

In some embodiments, the computation component 226 of FIG. 2 can use a predetermined randomness extraction algorithm such as, for example, a block parity extractor to process the initial random bit stream 36 and generate the secondary random bit stream 38. In some embodiments, the computation component 226 can select one or more randomness extraction algorithms from a list of randomness extraction algorithms stored in the memory 214 according to the initial random bit streams 36, and apply the selected one or more randomness extraction algorithms to process the initial random bit stream 36 and generate the secondary random bit stream 38.

Figure 3E:
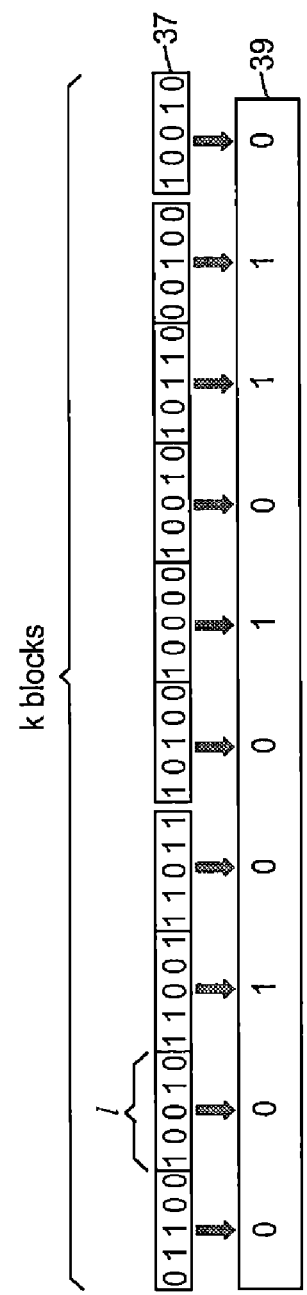
FIG. 3E illustrates processing an exemplary initial random bit stream by applying a block parity extractor to generate a secondary bit stream, according to one embodiment.

In the embodiment of FIG. 3E, an exemplary initial random bit stream 37 is processed by applying a block parity extractor to generate a secondary bit stream 39. The initial bit stream 37 is divided into k blocks (k being integers not less than one). Each of the blocks can include l bits or have a length l (l being integers not less than one). The parity of each block can be calculated to determine the corresponding bit of the secondary bit stream 39. For example, for a specific block, if the number of 0 bits is greater than the number of 1 bits in the specific block, the corresponding bit of the secondary bit stream 39 can be determined to be 0. If the number of 0 bits is not greater than the number of 1 bits in the specific block, the corresponding bit of the secondary bit stream 39 can be determined to be 1.

In some embodiments, an initial random bit stream such as, for example, the initial random bit stream 36 or 37 of FIG. 3D or 3E, can include n independent and biased (but not necessarily identically distributed) bits. The ith bit of the initial random bit stream can be distributed as a Bernoulli random variable with parameter $\delta \leq p_i \leq 1-\delta$, for some $0 < \delta < 1$. For every constant $\delta > 0$, every integer n and m, there is a function $f: \{0, 1\}^n \rightarrow \{0, 1\}^m$ that is an $\in$-extractor for the initial random bit, with $\in = m \cdot 2^{-\Omega(n/m)}$.

FIGS. 4A to 4E illustrates generating random numbers from optical images of a batch of material samples, according to one embodiment. "A batch of material samples" described herein refers to multiple material samples that include substantially the same composition, and/or produced by substantially the same process. Each of the material samples can exhibit similar properties having respective variability or inherent randomness.

Figure 4A:
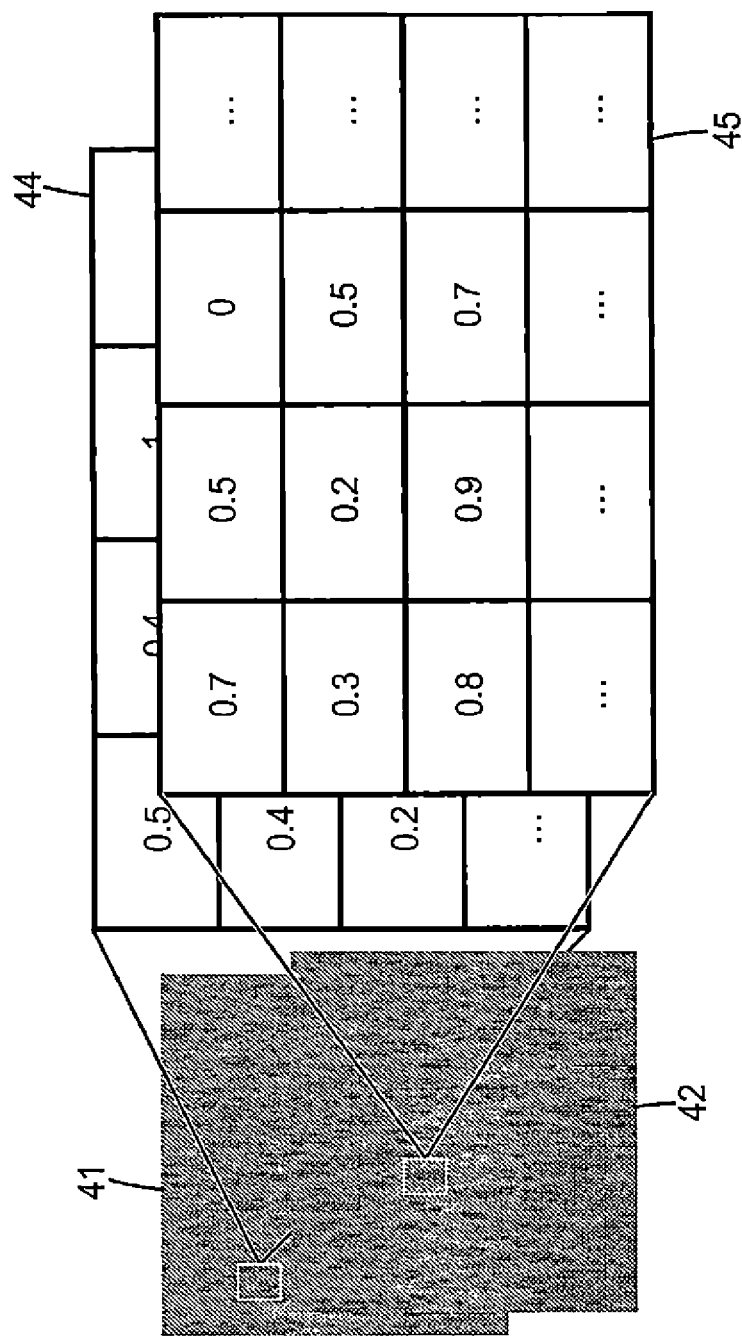
FIG. 4A illustrates optical images of a batch of material samples and intensity values of image pixels of the respective optical images, according to one embodiment.

FIG. 4A shows optical images 41 and 42 measured for a first material sample and a second material sample, respectively. The first and second material samples are from the same batch of material samples. The optical images 41 and 42 each include pixels having various intensities which related to a substructure or a texture on the surface of the respective material samples. The various intensities of the pixels reflect the inherent randomness of the substructure or texture of the respective material sample surface. The intensity values of image pixels in the respective portions of the optical images 41 and 42 are shown in Tables 44 and 45, respectively. The intensity values are normalized to be between 0 and 1 and are listed in arrays. The intensity values in Tables 44 and 45 vary with each other. Such variation reflects the randomness inherent in the properties of the material samples, and the randomness inherent in the processes for producing the batch of material samples.

Figure 4B:
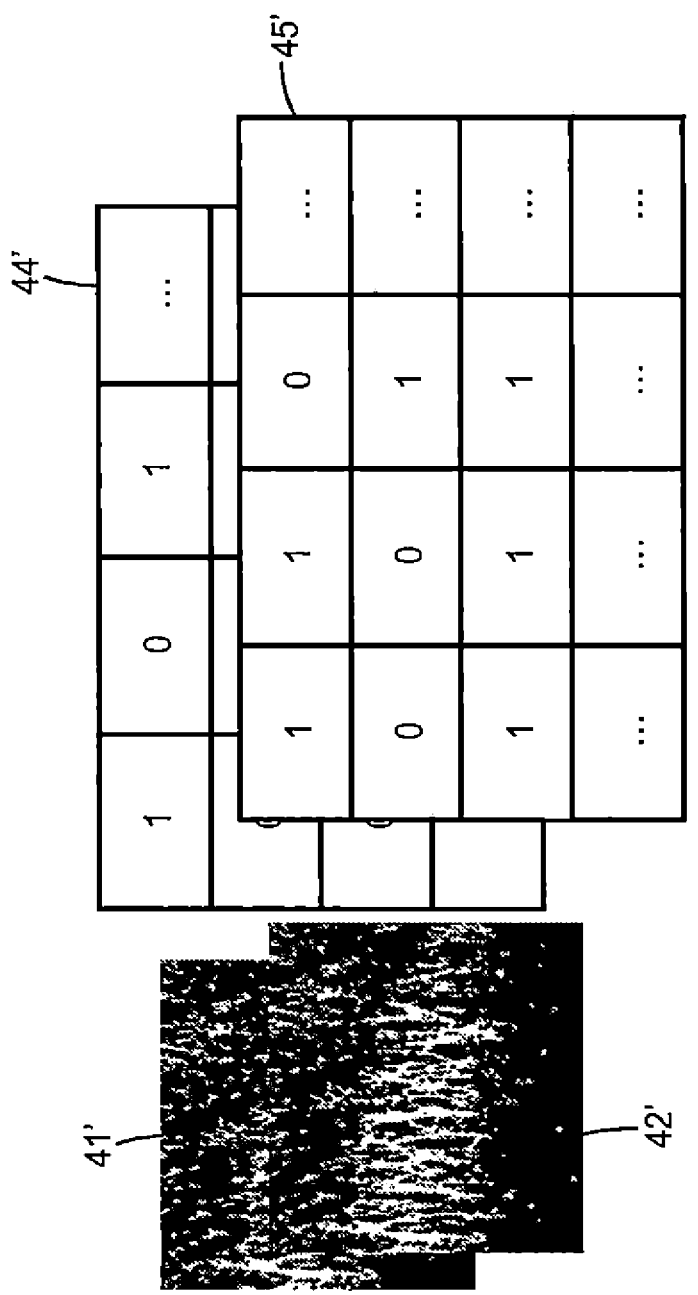
FIG. 4B illustrates converted optical images and binary representations of intensity values for the batch of material samples of FIG. 4A, according to one embodiment.
Figure 4C:
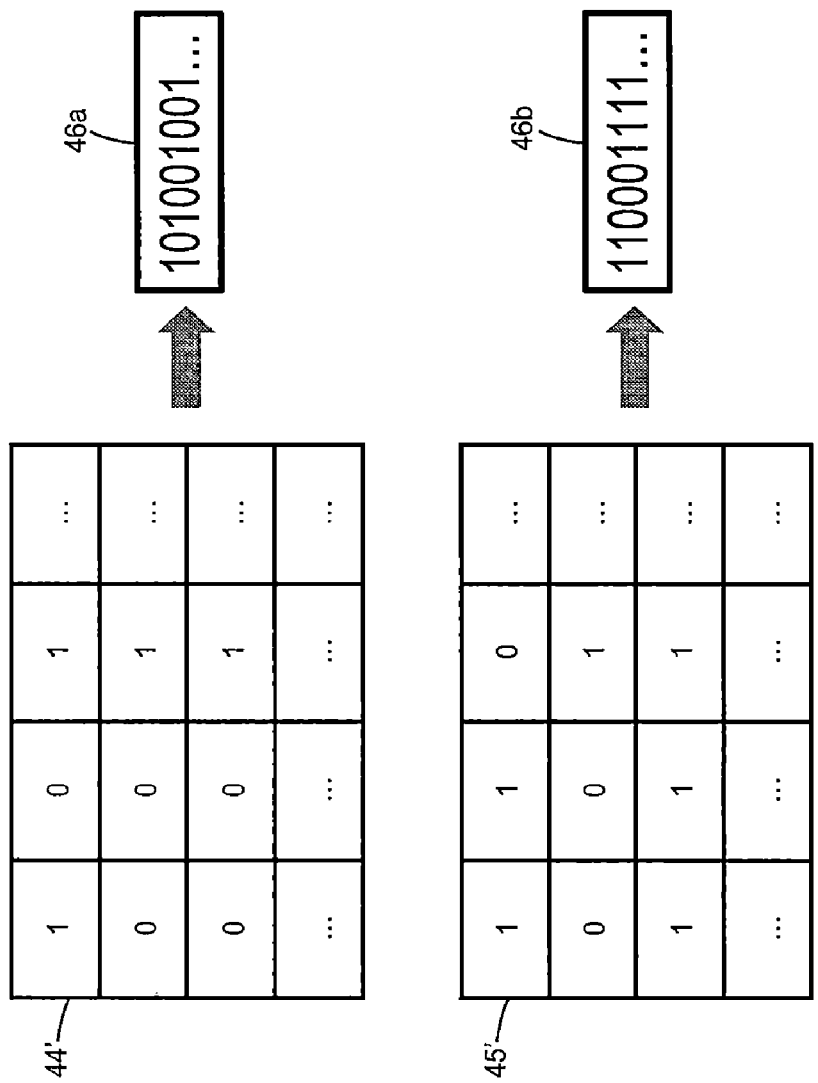
FIG. 4C illustrates deriving initial random bit streams based on the binary representations of FIG. 4B, according to one embodiment.

The optical images 41 and 42 can be respectively converted to binary representations 41' and 42' shown in FIG. 4B. Accordingly, the intensity values of image pixels in Tables 44 and 45 are converted into binary values 0 or 1 in Table 44' and 45'. The arrays of binary values are then vectorized, via for example the computation component 226 of FIG. 2, to obtain respective initial bit streams 46a and 46b each including a series of bits 0 or 1 as shown in FIG. 4C. The initial random bit streams 46a and 46b each can include the (m×n) number of binary bits which correspond to the binary representations 41' and 42' of the optical images 41 and 42 as shown in FIG. 4B.

Figure 4D:
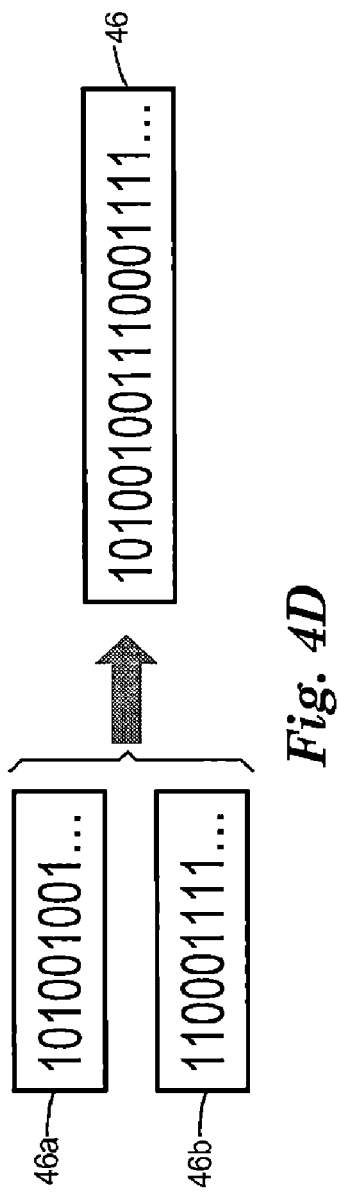
FIG. 4D illustrates concatenating the initial random bit streams of FIG. 4C, according to one embodiment.

The initial random bit streams 46a and 46b that are respectively derived from the first and second material samples can be combined, via for example the computation component 226 of FIG. 2, to obtain a combined random bit stream. In the embodiment of FIG. 4D, the initial random bit streams 46a and 46b are concatenated to be a combined initial random bit stream 46. It is to be understood that the initial random bit streams 46a and 46b can be combined in various manners to arrive at the combined initial random bit stream. Instructions for obtaining the combined initial bit stream 46 from the initial random bit streams 46a and 46b can be stored in the memory 214 and executed by the processor 212 of the computation component 226.

Figure 4E:
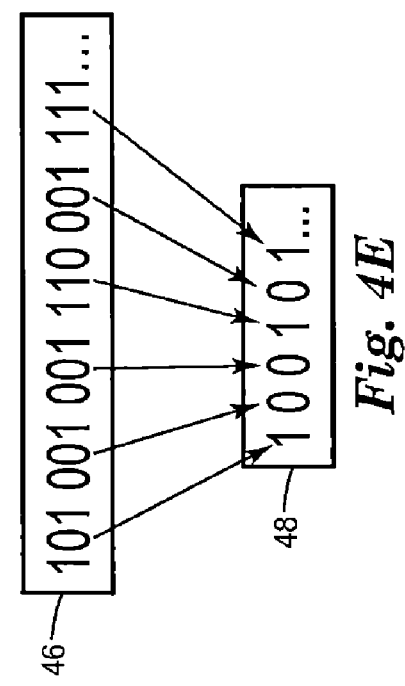
FIG. 4E illustrates generating a secondary random bit stream based on the concatenated random bit stream of FIG. 4D, according to one embodiment.

The combined initial random bit stream 46 is then processed, via for example the computation component 226, by applying a randomness extraction algorithm to generate a secondary random bit stream 48 as shown in FIG. 4E. The randomness extraction algorithm can include one or more of, for example, a block parity extractor, a von Neumann extractor, a random walk extractor, etc. It is to be understood that a randomness extraction algorithm can be iteratively applied to the initial bit stream and the secondary random bit stream to generate a final random bit stream. It is also to be understood that more than one randomness extraction algorithms can be combined to apply to the initial random bit stream.

The use of a batch of material samples may generate a random bit stream such as the secondary random bit stream 48 that is relatively longer that a random bit stream obtained from a single material sample. In addition, random bit streams obtained from a batch of material samples may be used for authentication of material samples.

As discussed above, an initial random bit stream can be processed by applying a randomness extraction algorithm to generate a secondary random bit stream. The performance of the randomness extractor can be justified by running the output of the randomness extractor through various tests for randomness. In some embodiments, a test suite by the National Institute for Standards in Technology can be used. The test suite can include tests of, for example, frequency, frequency within a block, runs, longest run of a block, spectral discrete Fourier transform (DFT), overlapping template match, approximate entropy, cumulative sums, etc.

In some embodiments, each of the above tests can be set up by taking a statistic of an initial or secondary random bit stream and fitting the statistic to a reference distribution. The reference distribution can be, for example, normal or chi-squared. The probability of failure under assumption of randomness (or a p-value) can be calculated. In some embodiments, if the p-value is below 0.01, a test failure is returned. In some embodiments, the secondary random bit streams described herein are capable of passing a test for independent, identically distributed (IID) random bits.

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

Exemplary embodiments of the present disclosure may take on various modifications and alterations without departing from the spirit and scope of the present disclosure. Accordingly, it is to be understood that the embodiments of the present disclosure are not to be limited to the following described exemplary embodiments, but is to be controlled by the limitations set forth in the claims and any equivalents thereof.

Various exemplary embodiments of the disclosure will now be described with particular reference to the Drawings. Exemplary embodiments of the present disclosure may take on various modifications and alterations without departing from the spirit and scope of the disclosure. Accordingly, it is to be understood that the embodiments of the present disclosure are not to be limited to the following described exemplary embodiments, but are to be controlled by the limitations set forth in the claims and any equivalents thereof.

The operation of the present disclosure will be further described with regard to the following detailed examples. These examples are offered to further illustrate the various specific and preferred embodiments and techniques. It should be understood, however, that many variations and modifications may be made while remaining within the scope of the present disclosure.

Examples

These Examples are merely for illustrative purposes and are not meant to be overly limiting on the scope of the appended claims. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Testing Material Samples

Figure 5:
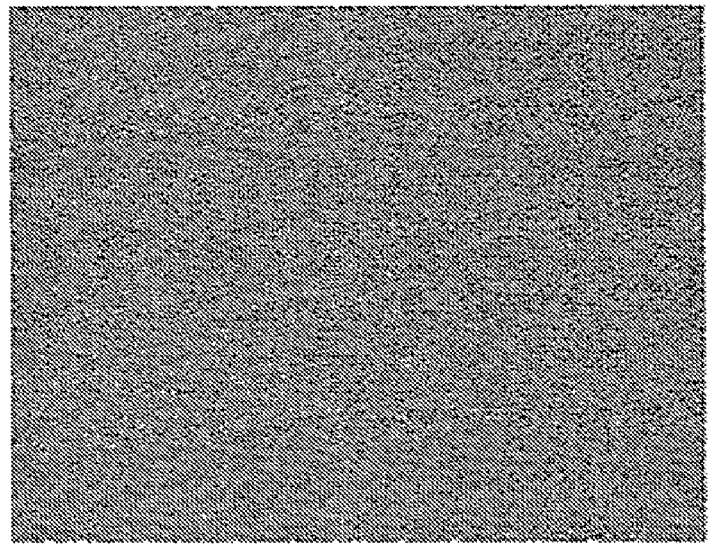
FIG. 5 illustrates an optical image of a flame-embossed film sample.
Figure 6:
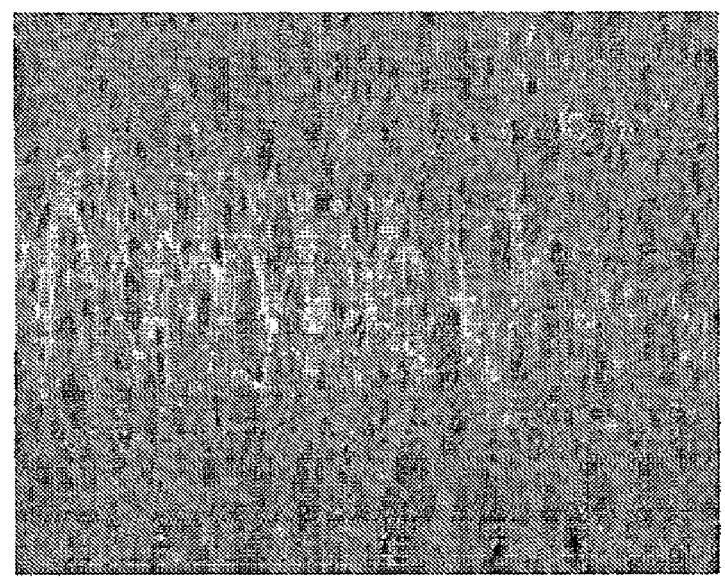
FIG. 6 illustrates an optical image of a nonwoven material sample.

Optical images for flame embossed films, blown microfiber (BMF) filtration materials, nonwoven materials, and resin materials commercially available from 3M Company, Saint Paul, Minn., are used to derive initial random bit streams. FIGS. 5 and 6 illustrate optical images for an exemplary flame-embossed film sample and an exemplary non-woven sample, respectively.

Testing Randomness Extraction Algorithms

A various randomness extraction algorithms were applied to the above initial random bit streams to generate secondary random bit streams. In particular, a block parity extractor was applied to the initial random bit streams.

A test suite by the National Institute for Standards in Technology was used to evaluate the derived initial random bit streams and the respectively generated secondary random bit streams. The test suite includes tests of, for example, frequency, frequency within a block, runs, longest run of 1s in a block, spectral discrete Fourier transform (DFT), overlapping template match, approximate entropy, cumulative sums, etc.

Each of the above tests was set up by taking a statistic of the initial or secondary random bit stream and fitting the statistic to a reference distribution. The reference distribution can be, for example, normal or chi-squared. The probability of failure under assumption of randomness (or a p-value) can be calculated. If the p-value is below 0.01, a test failure is returned.

Table 1 lists test results in terms of randomness for initial random bit streams derived from the flame embossed film sample. Each fail rate was calculated by running tests on 1000 different bit strings derived from the material sample.

TABLE 1

| Test | Fail Rate (128 bits) | Fail Rate (1024 bits) |
|---|---|---|
| Frequency (monobit) test | 0.097 | 0.009 |
| Frequency within a block | 0.026 | 0.103 |
| Runs test | 0.009 | 0.007 |
| Longest run of 1 s in a block | 0.031 | 0.007 |
| DFT (spectral) Test | 0.022 | 0.012 |
| Overlapping Template Match | 0.087 | 0.02 |
| Approximate Entropy | 0.045 | 0.006 |
| Cumulative Sums | 0.011 | 0.001 |

Table 2 lists test results in terms of randomness for the secondary random bit streams derived from the initial random bit streams of Table 1 by applying a block parity extractor. Each fail rate was calculated by running tests on 1000 different bit strings. 128 bit strings were extracted with l=45 initial random bits per secondary random bit. 1024 bit strings were extracted with l=5 initial random bits per secondary random bit.

TABLE 2

| Test | Fail Rate (128 bits) | Fail Rate (1024 bits) |
|---|---|---|
| Frequency (monobit) test | 0.014 | 0.014 |
| Frequency within a block | 0.012 | 0.015 |
| Runs test | 0.013 | 0.009 |
| Longest run of 1 s in a block | 0.009 | 0.005 |
| DFT (spectral) Test | 0.021 | 0.01 |
| Overlapping Template Match | 0.001 | 0.028 |
| Approximate Entropy | 0.017 | 0.008 |
| Cumulative Sums | 0.002 | 0.001 |

Table 3 lists test results in terms of randomness for initial random bit streams derived from the nonwoven material sample. Each fail rate was calculated by running tests on 1000 different bit strings derived from the material sample.

TABLE 3

| Test | Fail Rate (128 bits) | Fail Rate (1024 bits) |
|---|---|---|
| Frequency (monobit) test | 0.998 | 1 |
| Frequency within a block | 0.855 | 1 |
| Runs test | 0.433 | 0 |
| Longest run of 1 s in a block | 0.131 | 1 |

TABLE 3-continued

| Test | Fail Rate (128 bits) | Fail Rate (1024 bits) |
| --- | --- | --- |
| DFT (spectral) Test | 0.085 | 0.004 |
| Overlapping Template Match | 0 | 0.008 |
| Approximate Entropy | 0 | 0.008 |
| Cumulative Sums | 0.083 | 0.364 |

Table 4 lists test results in terms of randomness for the secondary random bit streams derived from the initial random bit streams of Table 3 by applying a block parity extractor. Each fail rate was calculated by running tests on 1000 different bit strings. 128 bit strings were extracted with l=288 initial random bits per secondary random bit. 1024 bit strings were extracted with l=90 initial random bits per secondary random bit.

TABLE 4

| Test | Fail Rate (128 bits) | Fail Rate (1024 bits) |
| --- | --- | --- |
| Frequency (monobit) test | 0.01 | 0.01 |
| Frequency within a block | 0.009 | 0.0025 |
| Runs test | 0.007 | 0.01 |
| Longest run of 1 s in a block | 0.01 | 0.0025 |
| DFT (spectral) Test | 0.02 | 0.01 |
| Overlapping Template Match | 0 | 0.0325 |
| Approximate Entropy | 0.008 | 0.005 |
| Cumulative Sums | 0.002 | 0 |

The application of the block parity extractor was benchmarked against state of the art pseudo random number generators (PRNGs), specifically the one built into MATLAB. The PRNG took a small random seed and generated a longer string which appears random. Table 5 lists test results in terms of randomness for the string generated by the MATLAB PRNG. Overall, the test results for the block parity extractor (e.g., Tables 2 and 4) has its performance be on par with the MATLAB PRNG (e.g., Table 5).

TABLE 5

| Test | Fail Rate (128 bits) | Fail Rate (1024 bits) |
| --- | --- | --- |
| Frequency (monobit) test | 0.014 | 0.005 |
| Frequency within a block | 0.011 | 0.011 |
| Runs test | 0.014 | 0.01 |
| Longest run of 1 s in a block | 0.009 | 0.007 |
| DFT (spectral) Test | 0.016 | 0.01 |
| Overlapping Template Match | 0.027 | 0 |
| Approximate Entropy | 0.015 | 0.012 |
| Cumulative Sums | 0.004 | 0.002 |

Reference throughout this specification to "one embodiment," "certain embodiments," "one or more embodiments," or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus, the appearances of the phrases such as "in one or more embodiments," "in certain embodiments," "in one embodiment," or "in an embodiment" in various places throughout this specification are not necessarily referring to the same embodiment of the certain exemplary embodiments of the present disclosure. Furthermore, the particular features, structures, materials, or characteristics may be combined in any suitable manner in one or more embodiments.

While the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth hereinabove. In particular, as used herein, the recitation of numerical ranges by endpoints is intended to include all numbers subsumed within that range (e.g., 1 to 5 includes 1, 1.5, 2, 2.75, 3, 3.80, 4, and 5). In addition, all numbers used herein are assumed to be modified by the term "about." Furthermore, various exemplary embodiments have been described. These and other embodiments are within the scope of the following claims.

What is claimed is:

1. A method of generating random numbers, comprising:
providing a batch of material samples, wherein the compositions of the batch of material samples are substantially the same, and are produced by substantially the same process;
measuring one or more material properties for each of the batch of material samples, the measured material properties having variability;
deriving one or more initial random bit streams from the measured material properties for each of the material samples; and
combining the initial random bit streams from the batch of material samples to obtain a combined random bit stream representing a randomness inherent in the process producing the batch of material samples.

2. The method of claim 1, wherein combining the initial random bit streams further comprises concatenating the initial random bit streams to obtain the combined random bit stream.

3. The method of claim 1, wherein the material properties include an optical feature, an acoustical feature, an elastic feature, a structural feature, an electronic feature, a magnetic feature, an electrets related feature, or a mechanical feature, and the variability of material properties is naturally formed or related to a specific manufacturing process for making the material samples.

4. The method of claim 1, further comprising generating one or more secondary random bit streams by applying a randomness extraction algorithm to the combined random bit stream.

5. The method of claim 1, wherein the batch of material samples is selected from the group consisting of abrasives, optical films, and nonwovens.

6. The method of claim 1, further comprising generating one or more secondary random bit streams by applying a randomness extraction algorithm to the derived initial random bit streams.

7. The method of claim 6, wherein the randomness extraction algorithm includes a block parity extractor.

8. The method of claim 6, wherein the secondary random bit streams are capable of passing a test of independent, identically distributed (IID) random bits.

9. The method of claim 1, wherein measuring the one or more material properties comprises capturing an image for a surface of each of the batch of material samples.

10. The method of claim 9, wherein deriving the initial random bit streams further comprises determining surface variations of a characteristic feature from the image of the material samples, the characteristic feature related to a substructure or a texture of the surface of the material samples, and converting the surface variations into the initial random bit streams.

11. The method of claim 10, wherein determining the surface variations further comprises converting the image to a binary representation based on intensity values of pixels of the image.

12. A method of extracting random numbers from a batch of sample materials, the compositions of the batch of material samples being substantially the same, and are produced by substantially the same process, the method comprising:
   measuring one or more material properties for each of the material samples, the measured material properties having variability;
   deriving one or more initial random bit streams from the measured material properties for each of the material samples;
   combining the derived initial random bit streams for the batch of material samples to arrive at a combined random bit stream; and
   generating one or more random numbers by applying a randomness extraction algorithm to the combined random bit stream.

13. The method of claim 12, wherein measuring the material properties comprises capturing surface images for the batch of material samples.

14. The method of claim 13, wherein deriving the initial random bit streams further comprises determining surface variations of a characteristic feature from the surface images.

15. The method of claim 14, wherein determining the surface variations further comprises converting the images to binary representations based on intensity values of pixels of the images.

16. The method of claim 12, wherein the material properties include an optical feature, an acoustical feature, an elastic feature, a structural feature, an electronic feature, a magnetic feature, an electrets related feature, or a mechanical feature.

17. A random number generator, comprising:
   a measurement component configured to measure one or more material properties for one or more material samples, the measured material properties having variability, wherein the one or more material samples are a batch of material samples, wherein the compositions of the batch of material samples are substantially the same, and are produced by substantially the same process; and
   a computation component functionally connected to the measurement component, the computation component including a processor configured to:
   derive one or more initial random bit streams from the measured material properties for each of the material samples; and
   combine the initial random bit streams from the batch of material samples to obtain a combined random bit stream representing a randomness inherent in the process producing the batch of material samples.

18. The random number generator of claim 17, wherein the processor is configured to generate one or more secondary random bit streams by applying a randomness extraction algorithm to the combined random bit stream.

19. The random number generator of claim 17, further comprises a memory configured to store material properties data.

20. The random number generator of claim 17, wherein the measurement component includes a camera configured to capture one or more images of the material samples.

* * * * *